(12) United States Patent
Joshi

(10) Patent No.: US 6,564,331 B1
(45) Date of Patent: May 13, 2003

(54) LOW POWER REGISTER FILE

(75) Inventor: Vivek Joshi, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/405,825

(22) Filed: Sep. 24, 1999

(51) Int. Cl.[7] .............................. G06F 1/32
(52) U.S. Cl. .................. 713/324; 713/300; 713/322; 365/230
(58) Field of Search ................ 365/230; 713/300, 713/322, 324

(56) References Cited

U.S. PATENT DOCUMENTS

| | | | | |
|---|---|---|---|---|
| 4,633,440 A | * | 12/1986 | Pakulski | 365/189 |
| 5,276,889 A | * | 1/1994 | Shiraishi et al. | 395/750 |
| 5,761,149 A | * | 6/1998 | Suzuki et al. | 365/230.3 |
| 5,996,083 A | * | 11/1999 | Gupta et al. | 713/322 |
| 6,188,633 B1 | * | 2/2001 | Naffziger | 365/230.05 |

FOREIGN PATENT DOCUMENTS

JP 402007286 A * 6/1988 ......... G11C/11/407

* cited by examiner

Primary Examiner—Dennis M. Butler
Assistant Examiner—Nitin C. Patel
(74) Attorney, Agent, or Firm—Leo V. Novakoski

(57) ABSTRACT

A mechanism is provided for reducing the power consumption of a register file by disabling unused register file read ports. A selected entry of the register file is hardwired to zero and the address of the selected entry is driven to the address decoder of the register file in response to a power-down condition. The power-down condition occurs when, for example, no valid address is driven to the read port, i.e. the read port is unused. For one embodiment of the invention, the selected entry is the zero[th] entry of the register file, and the address lines are grounded when an address valid bit associated with the read port is not asserted.

18 Claims, 4 Drawing Sheets

LOW POWER REGISTER FILE

BACKGROUND OF THE INVENTION

1. Technical Field

The present invention relates to the field of microprocessors, and in particular, to low power register files for use in microprocessors.

2. Background Art

Modern processors typically include extensive execution resources to support concurrent processing of multiple instructions. These execution resources receive data from a hierarchy of storage structures with varying access latencies. One or more register files are located on the processor chip to provide data to the execution resources with very low latencies. Other storage structure include on-chip caches, off-chip caches, and a main memory, which provide data to execution resources with correspondingly longer latencies. Because register files are a primary source of data for execution resources, high performance processors typically employ larger register files, which have more register entries and multiple read/write ports. These larger register files maintain more data near the processor's execution resources, where it can be accessed with relatively low latency by multiple execution units.

Multi-ported register files can create significant power demands on the processor. This is especially true when the register file is implemented in domino logic, which provides greater speed and lower loading than static logic in return for greater power dissipation. However, some of this power dissipation is unnecessary. For example, a register file provides data from the register entries indicated at its read ports on each cycle of the processor's clock. The register entries are indicated by voltage levels on each read port's address lines. When a read port is in use, these voltage levels represent a valid register identifier (ID) specified by an instruction in an associated execution unit. If the read port is not in use, i.e. if no instruction is driving a valid register ID to the port, the voltage levels on the read port's address lines typically retain their values from the previous access. Even though these values represent a no-longer-valid address, they cause data to be read out of a corresponding register entry, unless the read port is disabled.

The power consumed by these unnecessary reads can be significant, particularly for domino logic. Each bit of the register entry is represented by a storage node, which is in one of two voltage states according to whether the bit is a logic one or a logic zero. When the register entry is read, every storage node that represents a logic one discharges an associated domino node, which must be recharged for the next clock cycle. The power dissipated by discharging and recharging the domino node capacitances associated with no-longer-valid addresses is wasted. Register files based on static logic dissipate less power per read, but static logic is not typically suitable for large register files.

Similar power dissipation occurs on unused register file write ports. If unused write ports are not disabled, their logic gates change state ("toggle") with the processor clock, consuming additional power. In addition, toggling an unused write port increases the chances that the register entry associated with the no-longer-valid address voltages will be updated improperly.

Some register files disable unused read/write ports by ANDing the clock signal that drives the storage nodes with an enable signal, e.g. an address-valid bit. Other register files use a similar enable signal to qualify the word-lines associated with the storage nodes. In both cases, the enable signal is loaded by each entry in the register file. Since register file accesses are typically on a speed path in the processor, any increase in signal loading reduces the speed at which signals can be switched.

The present invention addresses these and other problems associated with power consumption by register files.

SUMMARY OF THE INVENTION

The present invention provides a mechanism for reducing power consumption by register files. A reference value is stored in a selected entry of the register file, and the address of the selected entry is driven to the address decoder of a register port whenever the port is not used. The reference value is chosen so that the voltage nodes associated with its component bits are not discharged when the value is read.

A register file in accordance with the present invention includes a word-line for each register file entry. An address decoder selects a word-line indicated by a received address, and a word line driver applies a voltage to the selected word-line. A power-control module drives a selected address to the decoder in response to a power-down signal.

For one embodiment of the invention, a selected register file entry is assigned a value of zero, and the power-control module drives the address of the selected register file entry to the address decoder in response to a power-down signal.

BRIEF DESCRIPTION OF THE DRAWINGS

The present invention may be understood with reference to the following drawings, in which like elements are indicated by like numbers. These drawings are provided to illustrate selected embodiments of the present invention and are not intended to limit the scope of the invention.

DETAILED DESCRIPTION OF THE INVENTION

The following discussion sets forth numerous specific details to provide a thorough understanding of the invention. However, those of ordinary skill in the art, having the benefit of this disclosure, will appreciate that the invention may be practiced without these specific details. In addition, various well-known methods, procedures, components, and circuits have not been described in detail in order to focus attention on the features of the present invention.

Figure 1A:
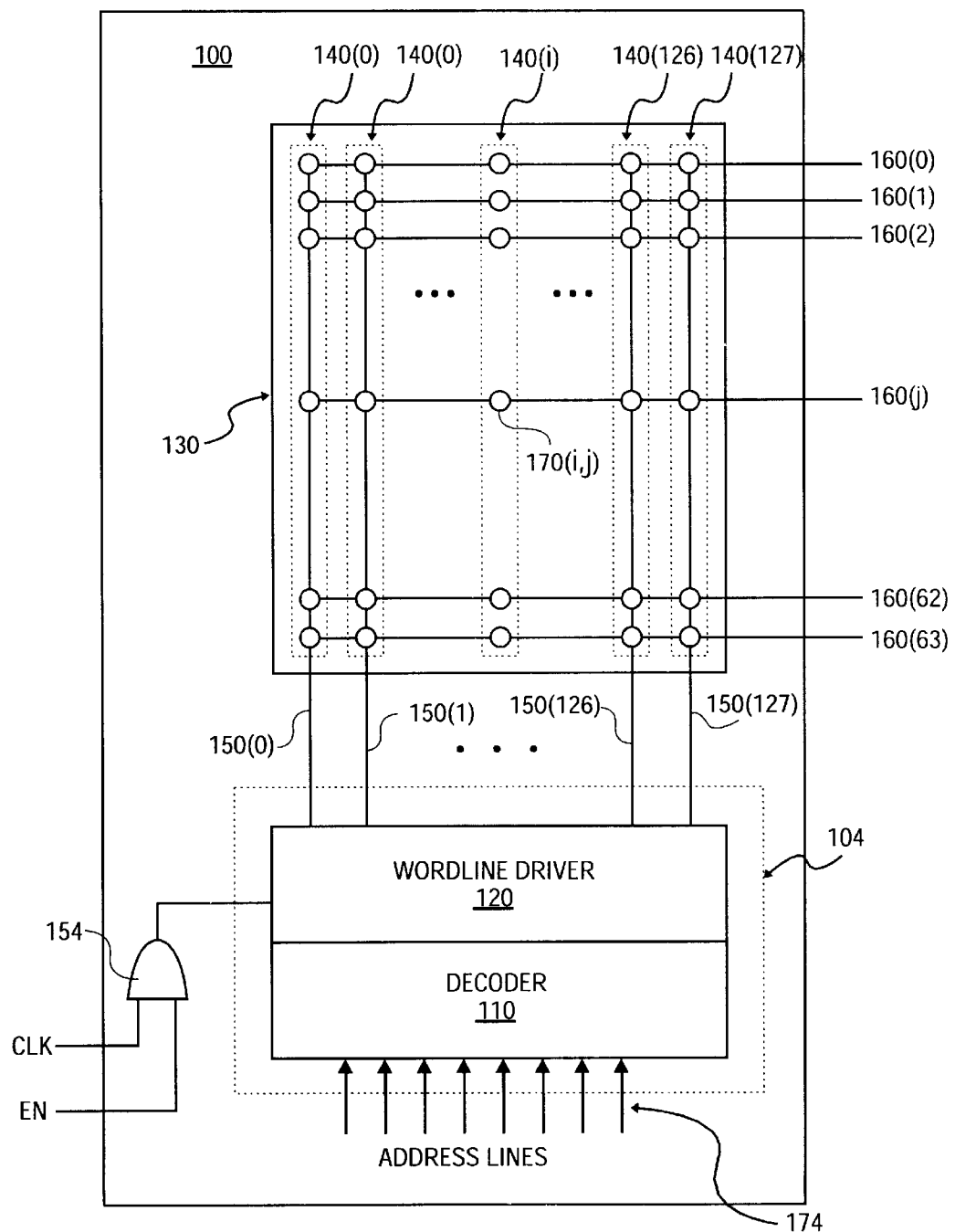
FIG. 1A is a block diagram of a register file that implements a conventional power reduction mechanism.

FIG. 1A is a block diagram of a register file 100 that implements a conventional power reduction mechanism. Register file 100 includes multiple read and write ports ("port") to access selected entries in a storage array 130. A single port 104 is shown in FIG. 1 for purposes of illustration. Port 104 includes an address decoder 110 and a word-line driver 120. For purposes of illustration, storage array 130 is shown having 128 register entries 140(0)–140(127) of 64 bits each.

Word-lines 150(0)–150(127) are associated with entries 140(0)–140(127), respectively, and bit lines 160(0)–160(63)

are provided for each of the 64 bits of an entry. A storage node is provided for each bit of each entry. An exemplary storage node 170(i, j) is shown at the intersection of $i^{th}$ word-line 140(i) with $j^{th}$ bit-line 160(j). Address lines 174 for address decoder 110 receive a register ID and select a corresponding one of word-lines 150. For example, driving register ID 1111110 to address decoder 110 selects word-line 150(126), which is driven to a first voltage state by word-line driver 120. The data stored at entry 140(126) may then be read out through bit-lines 160(0)–160(63). In the following discussion, indices are dropped from references to entries 140, word-lines 150, bit-lines 160 and other indexed elements, except where necessary to avoid ambiguity.

Figure 1B:
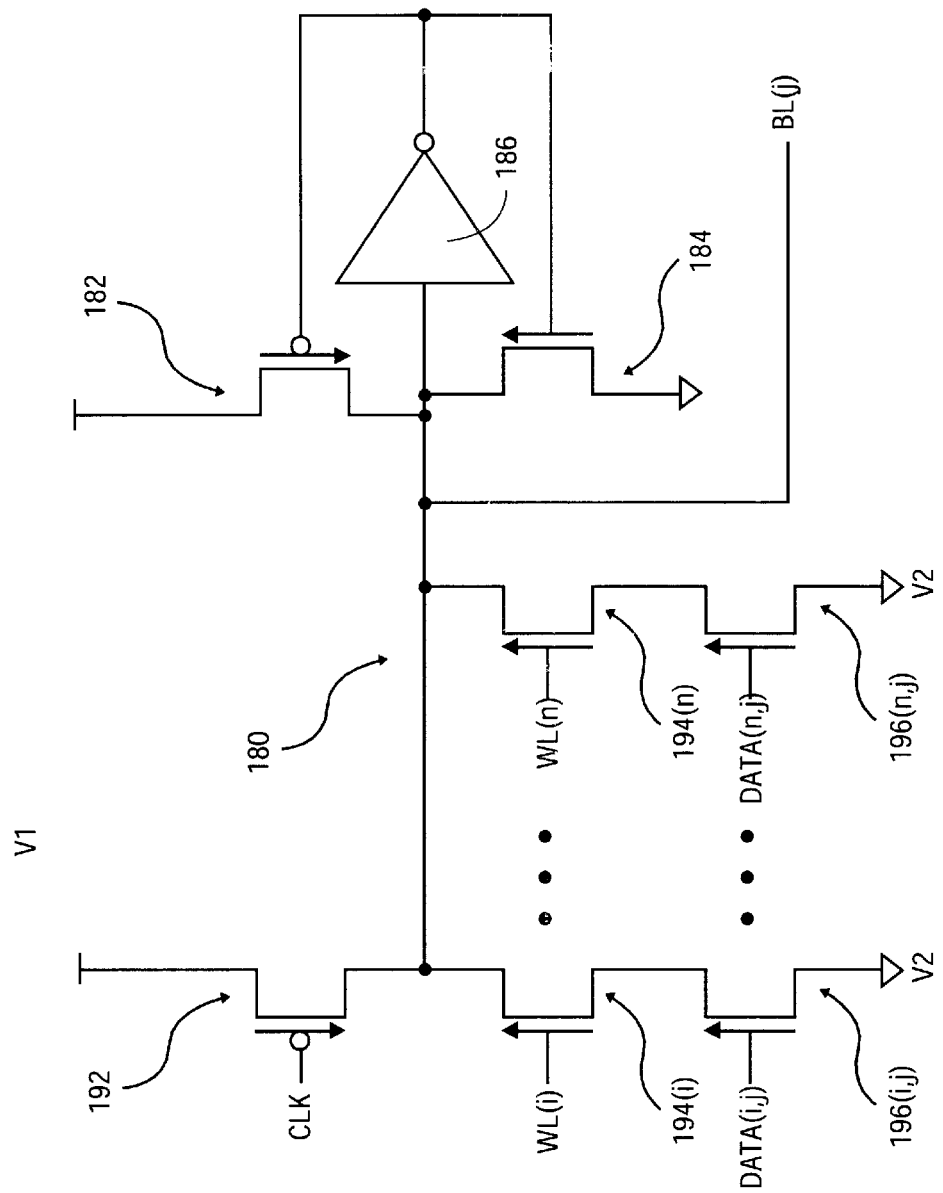
FIG. 1B is a circuit diagram of a storage node in the register file of FIG. 1.

FIG. 1B is a simplified diagram of storage node 170 for a register file based on domino logic. A domino node 180 is formed by the drains of a P-type transistor 182 and an N-type transistor 184. A feedback loop through an inverter 186 drives the gates of transistors 182 and 184, reinforcing the voltage at domino node 180. A P-type transistor 192 is connected between a first reference voltage (V1) and domino node 180. Transistor 192 is driven by a clock signal CLK to charge domino node 180 to high reference voltage (V1) when CLK goes low. For each entry in register file 100, first and second N-type transistors 194 and 196, respectively, provide a series connection between domino node 180 and a low reference voltage (V2). Entries i through n are shown in FIG. 1B. For example, transistor 194(i) is driven by a signal WL(i) from a corresponding word-line 150(i). The voltage representing the state of the bit stored at node 170(i, j) (DATA(i, j)) drives the gate of transistor 196(i, j).

To read DATA(i, j), WL(i) is brought high, and the voltage at domino node 180 is read through bit-line 160(j) when CLK goes high. If DATA is in a low voltage state ("low"), transistor 196(i, j) prevents domino node 180 from discharging. When CLK subsequently goes low, there is no need to recharge domino node 180 If DATA is in a high voltage state ("high"), transistor 196(i, j) allows domino node 180 to discharge. When CLK subsequently goes low, domino node 180 is recharged through transistor 192. Consequently, significantly more power is dissipated when DATA(i, j) is high than when it is low.

Referring again to FIG. 1A, each word-line 150 is driven by the output of an AND gate 154, which is in turn driven by a clock signal CLK and an enable signal EN. When the corresponding read port is not in use, EN is driven low, signaling a power-down condition. This prevents CLK from toggling transistor 192 and eliminates the charging and discharging of node 180 associated with reading DATA when it is high. An alternative register file may disable word-lines 150, which also prevents domino node 180 from discharging. In both cases, no power is dissipated as long as EN remains low.

One short-coming of this approach is that EN drives each word-line 150 or transistor 192, so the load on EN increases as the number of entries 140 in register file 100 increases. This approach requires greater power to drive EN, and the loading on EN impacts an important speed path in the processor. For this reason, many processor designers forgo power reduction mechanisms on register files.

Figure 2:
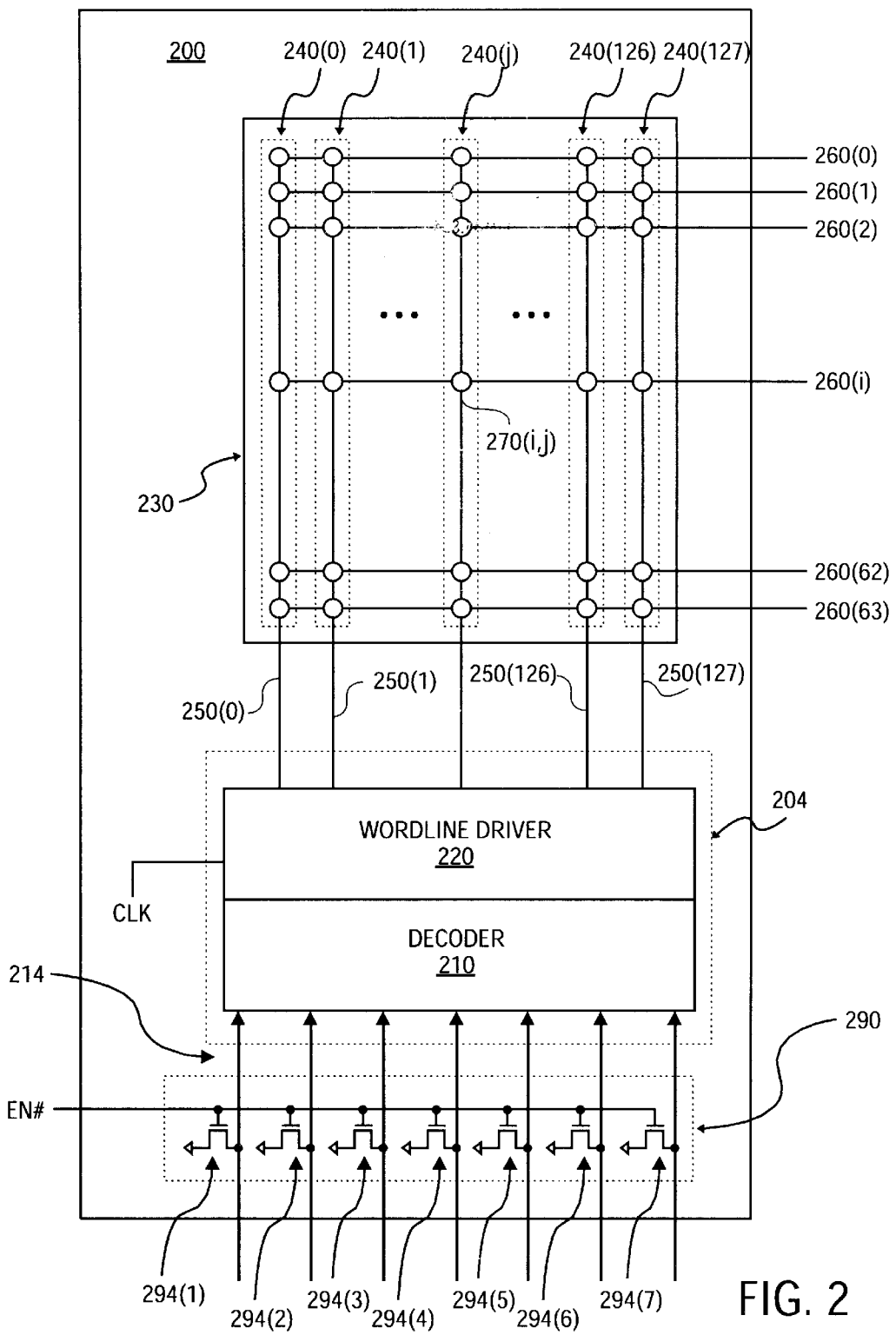
FIG. 2 is a block diagram of one embodiment of a register file in accordance with the present invention.

FIG. 2 is a block diagram of one embodiment of a register file 200 in accordance with the present invention. Register file 200 comprises a port 204 and a storage array 230. Register file 200 typically includes multiple read and write ports, but only one port is shown to keep the figure clear. Additional read and write ports have structures similar to port 204 and operate in a similar manner.

Port 204 includes an address decoder 210, a word-line driver 220 and a power control module 290. For the disclosed embodiment of register file 200, storage array 230 includes 128 entries 240(0)–240(127), each of which is 64 bits wide and is activated by an associated word-line 250(0)–250(127). A 64 bit operand may be read out of entry 240(i) through bit-lines 260(0)–260(63), when word-line 250(i) is activated. An exemplary storage node 270(i, j) is shown. Storage node 270(i, j) is formed by the intersection of the $i^{th}$ word-line 250(i) and bit-line 260(j) stores the $j^{th}$ bit of entry 240(i). Word-line 250(i) is activated by word-line driver 220 when its corresponding register ID is applied to address decoder 210.

Power control module 290 adjusts the address input to read port 204 when no valid address bits are available to drive it, e.g. when read port 204 is unused. For the disclosed embodiment of register file 200, power control module 290 comprises N-type transistors 294(0)–294(7) (collectively, "transistors 294") which couple address lines 214(0)–214(7), respectively, to a reference voltage. The gates of transistors 294 are driven by an enable signal, EN#, which is asserted low. When EN# is deasserted, i.e. driven to a high voltage state, transistors 294 short their corresponding address lines 214 to the reference voltage. For the disclosed embodiment of register file 200, the reference voltage is ground.

For the disclosed embodiment of register file 200, register entry 240(0) stores a zero at each of its 64 nodes. This may be accomplished by "hardwiring" the nodes of entry 240(0) to a ground reference voltage. When register entry 240(0) is selected by decoder 210 and word-line 250(0) is driven to its read voltage state, no current is discharged since DATA is low for each storage node 270(0, j). As discussed in conjunction with FIG. 1B, domino node 180 is not discharged when DATA is low, and consequently does not need to be recharged for the next read operation. Power dissipation in register file 200 is thus reduced by accessing register entry 240(0) when no address is actively driven to read port 204, i.e. when read port 204 is otherwise unused. For the disclosed embodiment, this is accomplished through power control module 290, which drives address 0000000 to decoder 210 when EN is deasserted.

Persons skilled in the art will recognize modifications to the disclosed embodiment that fall within the spirit of the present invention. For example, an entry other than 240(0) may be selected to store the reference value (zero) using a combination of N and P type transistors (and inverters) in control module 290 to produce the corresponding address. Similarly, if the storage nodes are implemented using complementary circuitry, the reference value with all bits high, i.e. ($2^{64}$–1) in a 64-bit embodiment, reduces power consumption in unused read ports.

A single entry dedicated to a fixed value does not represent a significant reduction in the capacity of register file 200, and some processors provide such an entry as a standard feature. For example, certain processors implement selected execution units as multiply-accumulate units ("MACs"). MACs are designed to implement the operation A*B+C efficiently. Here, operands A and B are multiplied together, and the product is incremented by operand C. Multiplication (C=0) and addition (A or B=1) are special cases of the basic MAC operation. Processors that employ MACs typically include register entries dedicated to the values 0 (for straight multiplication) and 1 (for straight addition) in the register files associated with the MACs. For example, the Merced processor has register entry 0 hardwired to zero and register entry 1 hardwired to one. For these processors, the dedicated register entry employed in embodiments of the present invention is already available.

Figure 3:
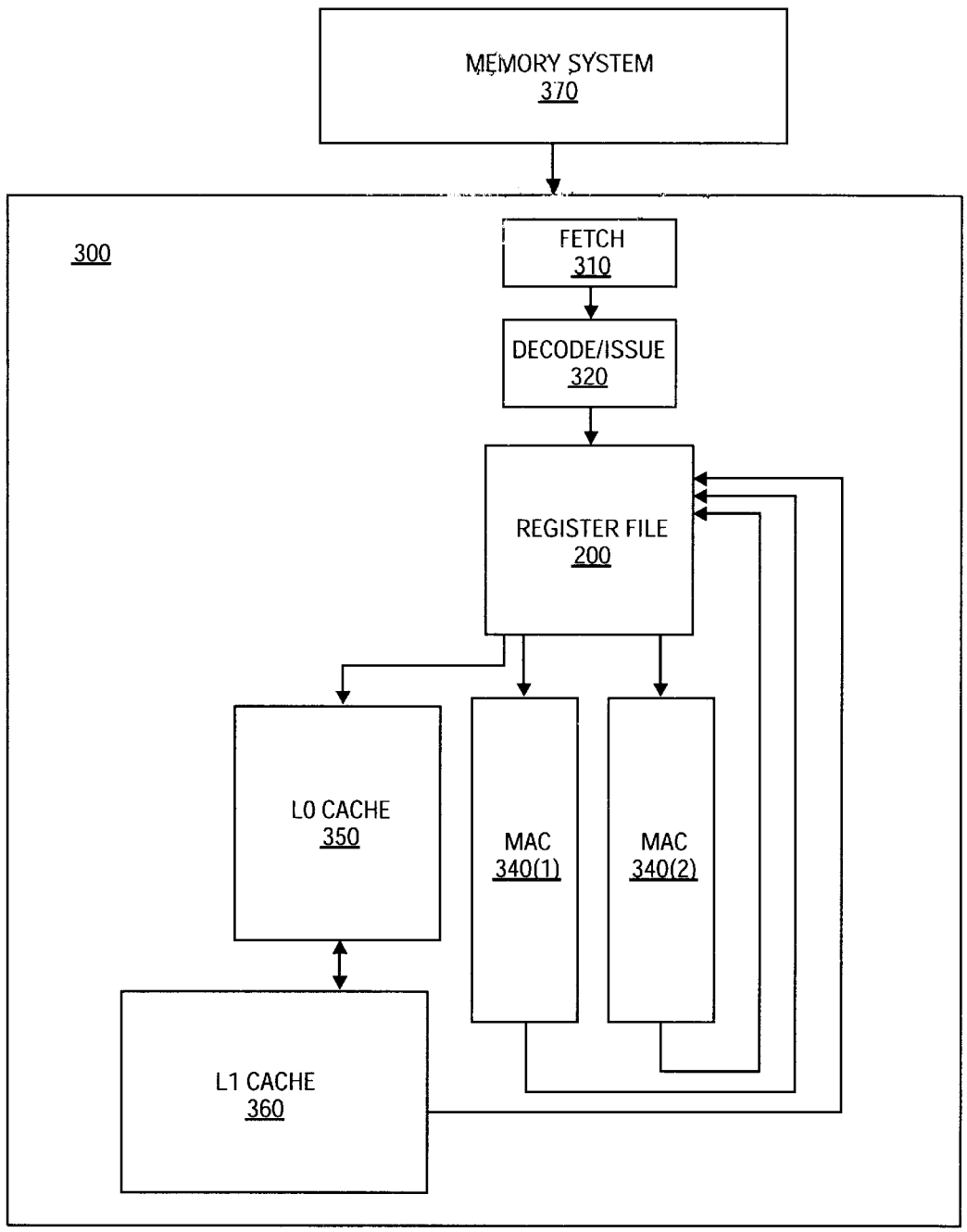
FIG. 3 is a block diagram of one embodiment of a processor incorporating a register file in accordance with the present invention.

FIG. 3 is a block diagram of one embodiment of a processor 300 that employs a register file 200 in accordance with the present invention. Processor 300 includes a fetch unit 310, a decode/issue unit 320, register file 200, an L0 cache 350, an L1 cache 360, and first and second MACs 240(0) and 240(2). Also shown is a memory system 370 to provide data and instructions to processor 300. L0 cache 250 and L1 cache 360, which may be considered part of memory system 370, are on the processor chip.

Fetch unit 310 retrieves one or more instructions from memory system 370 and provides the instruction(s) to decode/issue unit 320. Decode/issue unit 320 decodes the instruction to determine the type of operation it represents and the operands on which the indicated operation is to be performed. These operands are typically specified through the register identifiers (IDs), which are logical identifiers that point to particular entries in an associated register file. Decode/issue unit 320 provides each register ID to a read port 204 of register file 200, which accesses the requested operands and provides them to MACs 340. Result operands generated by MACs 340 may be written back to register file 200 through write ports 208.

In addition to MACs 340, caches 350 and 360 may access register file 200 for read or write operations. For example, L1 cache 360 may write certain data to register file 200 to update one or more of its entries, and selected entries may be read to L0 cache 350 to, for example, free up space in register file 200 for new data.

It is evident from FIG. 3 that register file 200 provides multiple read and write ports to service the different resources that depend on it for data. For example, if decode/issue unit 320 issues two MAC instructions in a given clock cycle, data for the operation is accessed through six read ports 204 (FIG. 2). However, if one or no MAC operations are issued, unused read ports 204 are available. If nothing is done, voltage values applied to the unused read ports do not represent valid addresses, and reading the entries associated with these addresses burns power unnecessarily.

To reduce power dissipation associated with reading non-zero bits from the register entries, power control module 290 (FIG. 2) asserts a selected address to register file 200 for each read port 204 that is not in use. For the disclosed embodiment, zero is hardwired into register entry 240(0) and the register ID of this entry, 0000000, is driven to the address decoders of the unused read ports by power control module 290. The number/identity of unused read ports may be signaled, for example, through an address-valid bit provided by fetch unit 310 or decode/issue unit 320. The valid bit signals when a valid address is being asserted to the address decoder of register file 200. For a six read port register file 200, two MAC operations use all read ports when issued concurrently. Other combinations of instructions may use some subset of the 6 read ports, as indicated by associated valid bits, leaving a complementary subset of the read ports to be powered down. Power control unit 290 does this by driving 000000 to the address decoders of unused read ports, e.g. those for which the address-valid bit is not asserted. A load/store unit may also generate valid bits to enable/disable the read port during load operation.

Since entry 0 in the register file is hardwired to a logical 0, similar power-down operations can be implemented for write ports to avoid unnecessary toggling. The write address is driven to entry 0 when indicated by, e.g., a valid bit associated with write operations. Since entry 0 is hardwired to zero, writes to entry 0 are effectively ignored. In addition, no power is dissipated by the address decoder when the port is unused on successive cycles. The address asserted on the port is unchanged between clock cycles and the component logic does not toggle. This is true for both read and write ports that remain unused on consecutive clock cycles. For write ports, an enable signal may be derived from a valid bit generated during a write-back stage of the instruction pipeline. Similarly, store operations may generate the valid bits used to enable/disable write ports.

The present invention thus provides an efficient, low cost mechanism for reducing power consumption in register files. A selected entry of the register file stores a reference value such as zero, and the address of this selected entry is driven to the address decoder associated with each unused port of the register file. The reference value is chosen so that the voltage nodes that represent the reference value do not discharge any current when read. As a result, no pre-charge is necessary to restore the state of the node following the read event.

Persons skilled in the art of processor design and having the benefit of this disclosure will recognize variations and modifications of the disclosed embodiments that fall within the spirit and scope of the present invention.

I claim:

1. A register file comprising:
   a plurality of word-lines, each word-line corresponding to a register entry;
   a decoder to select one of the word-lines according to a register address driven to an associated port;
   a word line driver to apply a voltage to the selected word-line; and
   a power-module to drive a selected address to the associated port if the port is not in use.

2. The register file of claim 1, wherein the decoder include N address lines and the power module comprises N transistors, each of the N transistors being coupled between one of the N address lines and a reference voltage.

3. The register file of claim 2, wherein a gate of each of the N transistors is driven by a signal that indicates if the associated port is in use.

4. The register file of claim 1, wherein the selected address corresponds to a register entry that is hardwired to zero.

5. The register file of claim 4, wherein the selected address has all address bits zero.

6. The register file of claim 5, wherein the power module shorts all address bits to zero if the associated port is not in use.

7. The register file of claim 6, wherein the power module includes a transistor for each address bit, each transistor to couple its associated address bit to ground if the associated port is not in use.

8. A processor comprising:
   an instruction decoder to determine a first register ID specified by an instruction;
   an address decoder to identify a register entry indicated by a register ID asserted to an associated register port; and
   a power module to couple the first register ID to the decoder if the associated register port is used for the instruction and to coupled a second register ID to the decoder if the register port is not used.

9. The processor of claim 8, wherein the selected register ID corresponds to a register entry that is hardwired to a reference voltage.

10. The processor of claim 9, wherein the selected register ID has all bits in a first voltage state and the power module couples inputs of the address decoder to the reference voltage state if the register port is not used.

11. The process of claim 8, wherein the address decoder has an N-bit register ID input and the power module comprises N transistors, each transistor to couple one of the N-bits to a reference voltage if the register port is not used.

12. The processor of claim 8, wherein a signal that indicates the port is not in use is asserted if an invalid operand is expected on a read port associated with the address decoder.

13. A method for reducing power-consumption of a register file comprising:

detecting a signal that indicates if a port of the register file is to be used by an operation;

asserting to the port an address specified by the operation if the port is to be used; and asserting to the port a preselected address if the port is not to be used by an operation.

14. The method of claim 13, wherein asserting the preselected address comprises asserting an address corresponding to a register file entry having all bits zero.

15. The method of claim 14, wherein the preselected address corresponds to a zero$^{th}$ entry of the register file.

16. The method of claim 13, wherein asserting a preselected address comprises asserting the preselected address to transistors that couple address inputs of the register file to a reference voltage to apply the reference voltage to the address inputs.

17. The method of claim 16, wherein the reference voltage is ground.

18. The method of claim 13, wherein asserting the preselected address to the register file comprises asserting an address corresponding to a register file entry that is hardwired to zero.

* * * * *